US006233452B1

United States Patent
Nishino (10) Patent No.: US 6,233,452 B1
(45) Date of Patent: May 15, 2001

(54) WIRELESS INFORMATION PROCESSING TERMINAL AND CONTROLLING METHOD THEREOF

(75) Inventor: Kiyoshi Nishino, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/109,568

(22) Filed: Jul. 2, 1998

(30) Foreign Application Priority Data

Jul. 4, 1997 (JP) .................................................. 9-179195

(51) Int. Cl.[7] .............................. H04Q 7/20; G06F 15/16
(52) U.S. Cl. ........................... 455/435; 455/440; 709/227
(58) Field of Search .................................... 709/227, 246; 370/352, 393, 913; 455/432, 434, 439, 62, 465, 422, 428, 456, 433, 435, 440; 341/22

(56) References Cited

U.S. PATENT DOCUMENTS

| | | | | |
|---|---|---|---|---|
| 5,465,397 | * | 11/1995 | Pickert | 455/62 |
| 5,493,696 | * | 2/1996 | Wolf | 455/465 |
| 5,727,159 | * | 3/1998 | Kikinis | 709/246 |
| 5,737,333 | * | 4/1998 | Civanlar et al. | 370/352 |
| 5,742,598 | * | 4/1998 | Dunn et al. | 370/393 |
| 5,815,814 | * | 9/1998 | Dennison et al. | 455/456 |
| 5,835,061 | * | 11/1998 | Stewart | 342/457 |
| 5,905,955 | * | 5/1999 | Bamburak et al. | 455/434 |
| 5,911,485 | * | 6/1999 | Rossmann | 341/22 |
| 5,946,618 | * | 8/1999 | Agre et al. | 455/428 |
| 5,963,861 | * | 10/1999 | Hanson | 455/422 |

FOREIGN PATENT DOCUMENTS

| | | | |
|---|---|---|---|
| 0597638 | 5/1994 | (EP) . | |
| 8149564A | 6/1996 | (JP) | H04Q/7/38 |
| 944527 | 2/1997 | (JP) | G06F/17/30 |
| 9134371A | 5/1997 | (JP) | G06F/17/30 |
| 9429995 | 12/1994 | (WO) . | |

OTHER PUBLICATIONS

"Architecture for Interworking Data over PCS", V. Varma, et al, Sep. 1996, IEEE Communications Magazine, vol. 34, No. 9, pp 124–130.

* cited by examiner

Primary Examiner—Zarni Maung
Assistant Examiner—Patrice Winder
(74) Attorney, Agent, or Firm—Douglas W. Cameron; Anne Vachon Dougherty (57) ABSTRACT

An improved wireless information processing apparatus that is connectable to an appropriate one of the access points prepared by an internet provider even under a mobile environment. A terminal and method of operation whereby a user of the terminal requests connection to the Internet, the terminal extracts a CS-ID from notification information transmitted from a wireless base station and, then, retrieves its own association table to acquire a telephone number of an access point nearest to the current location. Then, the terminal dials-up to the acquired access point to establish an internet connection. As a result, the terminal is allowed to download an electronic mail destined therefor, a Web page (HTML file or the like) stored in a disk of a given Web server and the like. Alternatively, the terminal is allowed to transmit data contained therein (or a file and/or an electronic mail edited on this terminal) to another computer system connected to the Internet, or to upload such data to a disk of a given Web server.

10 Claims, 5 Drawing Sheets

WIRELESS INFORMATION PROCESSING TERMINAL AND CONTROLLING METHOD THEREOF

FIELD OF THE INVENTION

The invention relates to a wireless information processing terminal and control method for providing wireless communication functions like a PHS (Personal Handyphone System) and, more particularly, to a wireless information processing terminal that has additional information processing functions like a PDA (Personal Digital Assistant) and a method of controlling the same. More specifically, the invention relates to a wireless information processing terminal of the type which is connectable to a BBS (Bulletin Board System), to a provider of the Internet, or to an access point prepared by such a provider, and a method for controlling the same.

BACKGROUND OF THE INVENTION

In the prior art, various types of "Telecomputing Systems" have been developed and commercially exploited for connecting remotely located computers together by using a communication network such as a PSTN (Public Switched Telephone Network). In Japan, for example, with enforcement of the telecommunications business code law in 1985, the so-called "Personal Computer Network" has flourished remarkably. A computer user, who enters into a contract with a service provider of a personal computer network, is allowed to access a given host (i.e., information server) of the provider.

A major trend of telecomputing in the recent years is to exploit the Internet. As well known in the art, the Internet is a generic name for networks around the whole world interconnected together based on the network "NSFnet", which was established in 1970's on an investment of the National Science Foundation (U.S.A.). While the Internet was originally intended to construct an international network for connecting universities and/or research institutions in 54 countries to facilitate exchange of information among them, as a respective server (mainly, UNIX workstation) installed at each of the universities and/or research institutions repeated interconnections independently, the network has grown into an enormous collection of networks covering the whole world with the present day Internet comprising several hundred thousands of servers scattered around the whole world. Remotely located server machines are interconnected in accordance with a protocol called "TCP/IP" (Transmission Control Protocol/Internet Protocol), whereby a data transfer or a communication on a BBS may be made between the connected computer systems.

While the prior (i.e., the originally intended) Internet was tinged with connections between computer systems in a UNIX environment, with its opening to the general public in 1994 and the resultant advent of providers (service providers), it has become widespread among general business organizations and/or individual users in an accelerative manner. For example, major service providers of personal computer networks in Japan (e.g., "PC-VAN", "NiftyServe" and the like) are now providing Internet connection services as well.

Since the Internet comprises a collection of networks, each having a different administrative/controlling organization with a different policy, there is no centralized organization to inclusively manage the Internet as a whole. In other words, each of the servers (e.g., database servers, file servers) scattered around the whole world is locally managed by a user in a network. Also, via a server connected to the Internet, each user of the Internet may act as an information provider, or may access any information on the Internet in a seamless manner. This is quite in contrast to the conventional "Personal Computer Network", which allows limited access to a given host only. Incidentally, as distinguished from "Internetworking", which means to connect networks of certain business organizations together to construct a wide area network, the Internet is commonly denoted in English as the aforementioned proper noun ("the Internet").

As described, the substance of the Internet does not reside in a single computer system that is administered by a particular business organization or corporation. Rather, its substance resides in a collection of interconnected networks, each comprising a number of computer systems (server machines) for storing information.

In order to make use of the Internet, a user must connect his/her own computer (personal computer) to a subscriber server as its client. If the user is a researcher or a student, his/her computer may be connected as a client to a server machine owned by a research institute or a college to which the user belongs. On the other hand, in case of a general or regular user, he/she must enter into a contract with a commercial internet service provider (hereinafter called "an internet connection provider" or "service provider"). Some commercial internet services include "IBM internet connection service" of IBM Japan, Ltd., "BEKKOAME/INTERNET" of Bekkoame Internet, and the like.

While there are several types of contracts with a service provider, one of the services that is most easily available to an individual user is the so-called "dial-up IP" (IP standing for Internet Protocol). As well known, in the art, any computer system (server) connected to the Internet must acquire an identification number called an "IP address". In addition to its own IP address for connecting to the Internet, a service provider has a number of IP addresses, which are sequentially assigned to each of the contracted users who requests an Internet connection via a telephone line (i.e., dials-up), thereby to provide a window of the Internet. Also, most of the service providers have established connection points (i.e., access points) to be dialed-up by contracted users in all major cities of the country. Thus, a user may save his/her telephone charges by dialing up to the nearest access point. In other words, a user may use a telephone line and a modem for connecting his/her own PC to a server of a service provider as its client, thereby to establish a connection to the Internet. Further, through this server, the user may access data at another server (e.g., Web page) on the Internet.

On the other hand, a great variety of information equipment has been connected to the Internet. That is, when the Internet was beginning to spread, personal computers (PCs) installed at fixed sites such as offices, homes, eand the like were dial-up IP-connected using wires primarily. However, in these days, it is not unusual to establish a dial-up IP connection by using a PDA or PHS that has further improved portability/mobility over a notebook PC. Under a mobile environment, it is very rare to do a hard job using a word processing program (document editing) or a spreadsheet program. Rather, it is mostly sufficient to do a lighter job such as transmission of reports in the form of electronic mails. While a PDA (Personal Digital Assistant) or PHS (Personal Handyphone System) is merely capable of executing a simple application alone due to its limited input/output and processing capabilities, nevertheless it is capable of exchanging electronic mail and displaying data (e.g., text portions only). This is why, in a mobile environment, use of a PDA or a PHS, having a smaller size and a lighter weight, is desired over the use of a PC adhering to the full specifications.

More particularly, in the case of using a terminal such as a PHS that implements wireless communication functions, there is no need for a user to care about the position of a modular jack. That is, there is no need for a user of the Internet to stay at a particular site at all and, thus, the user may freely establish a dial-up IP connection under a mobile environment such as outdoors or any location to which the user moves. An advantage of connection to the Internet by means of a wireless communication terminal resides in the fact that its user is allowed to distribute electronic mail or to participate in BBS based on data/information acquired under a mobile environment, thereby to maintain immediateness or freshness of data. In other words, a wireless communication terminal of the portable type may become an information source having improved mobility. Further, a PHS is better than a cellular telephone in terms of lower manufacturing/operation costs, since a PHS has no limitation of frequency assignment or the like.

Even under a mobile environment, a user may be freely connected to the Internet for exchanging desired data or electronic mail. However, under a mobile environment, the nearest access point is not necessarily fixed. In the same manner as a user of a PHS or cellular telephone moves across cells, a mobile user is able to freely move across access points. As for a desktop PC installed at a particular site in a fixed manner, its nearest access point is also fixed and, thus, the previously setup access point may be used without any change. However, this is not true for a mobile user as set forth above.

There is no doubt that making a dial-up IP connection from the nearest access point requires the lowest cost. However, it will be extremely difficult or cumbersome for a user to store the nearest access point (telephone number) for each moving location respectively, or to change setup contents of a program.

It is, therefore, an object of this invention to provide an improved wireless information processing terminal that has additional information processing functions like PDA, and a method of controlling the same.

It is another object of this invention to provide an improved wireless information processing terminal that is connectable to a BBS or to an access point prepared by an internet provider for communicating data, and a method of controlling the same.

It is yet another object of this invention to provide an improved wireless information processing terminal that is connectable to an appropriate one of the access points prepared by an internet provider even under a mobile environment (i.e., at each moving location), and a method of controlling the same.

SUMMARY OF THE INVENTION

These and other objectives are realized by the present invention comprising a wireless information processing terminal which is movable across a plurality of wireless cells, and which executes a wireless data exchange operation with a wireless base station serving one of said wireless cells where said terminal currently resides, said terminal comprising: communication means for executing a communication with a wireless base station; means for extracting a base station-ID from data received from a wireless base station; memory means for storing associations between the base station-IDs and the nearest access points of a provider; access point retrieving means for consulting said memory means and retrieving one of the access points associated with a current wireless base station; and means for attempting to establish a connection to the retrieved access point.

A second aspect of this invention resides in a wireless information processing terminal which is movable across a plurality of wireless cells, and executes a wireless data exchange operation with a wireless base station serving one of said wireless cells where said terminal currently resides, said terminal comprising: communication means for executing a communication with a wireless base station; display means for displaying processed data and the like; means for extracting a base station-ID from data received from a wireless base station; memory means for storing associations between the base station-IDs and the nearest access points of a provider; access point retrieving means for consulting said memory means and retrieving one of the access points associated with a current wireless base station; means for attempting to establish a connection to the retrieved access point; data download means for downloading data through the connected access point; and display control means for causing said display means to display the downloaded data.

A third aspect of this invention resides in a wireless information processing terminal which is movable across a plurality of wireless cells, and executes a wireless data exchange operation with a wireless base station serving one of said wireless cells where said terminal currently resides, said terminal comprising: communication means for executing a communication with a wireless base station; input means for allowing a user to input data and a command; means for extracting a base station-ID from data received from a wireless base station; memory means for storing data and a program; writing means for writing a user inputted telephone number of an access point of a provider into said memory means in association with the base station-ID of a current wireless base station; retrieving means, being responsive to a user's request for connecting to an access point, for accessing said memory means and retrieving the telephone number of an access point associated with the base station-ID of the current wireless base station; and means for attempting to establish a connection to the access point retrieved by said retrieving means.

A fourth aspect of this invention resides in a wireless information processing terminal which is movable across a plurality of wireless cells, and executes a wireless data exchange operation with a wireless base station serving one of said wireless cells where said terminal currently resides, said terminal comprising: communication means for executing a communication with a wireless base station; display means for displaying processed data and the like; input means for allowing a user to input data and a command; means for extracting a base station-ID from data received from a wireless base station; memory means for storing data and a program; writing means for writing a user inputted telephone number of an access point of a provider into said memory means in association with the base station-ID of a current wireless base station; retrieving means, being responsive to a user's request for connecting to an access point, for accessing said memory means and retrieving the telephone number of an access point associated with the base station-ID of the current wireless base station; means for attempting to establish a connection to the access point retrieved by said retrieving means; data download means for downloading data through the connected access point; and display control means for causing said display means to display the downloaded data.

A fifth aspect of this invention resides in a wireless information processing terminal which is movable across a plurality of wireless cells, and executes a wireless data exchange operation with a wireless base station serving one of said wireless cells where said terminal currently resides, said terminal comprising: communication means for executing a communication with a wireless base station; display means for displaying processed data and the like; means for extracting a base station-ID from data received from a wireless base station; memory means for storing associations between the base station-IDs and telephone numbers of the nearest access points of an internet provider; access point retrieving means for accessing said memory means and retrieving the telephone number of an access point associated with the current wireless base station; means for dialing to the retrieved access point; data download means for downloading Web data through the dialed access point; and display control means for causing said display means to display the downloaded Web data.

A sixth aspect of this invention resides in a method of controlling a wireless information processing terminal which is movable across a plurality of wireless cells, said terminal having a table for describing associations between base station-IDs and the nearest access points of a provider, and executing a wireless data exchange operation with a wireless base station serving one of said wireless cells where said terminal currently resides, said method comprising the steps of: receiving notification information from a wireless base station serving one of said wireless cells where said terminal currently resides; extracting a base station-ID from said received notification information; retrieving said table to acquire one of the access points associated with the base station-ID; and attempting to establish a connection to the acquired access point.

A seventh aspect of this invention resides in a method of controlling a wireless information processing terminal which is movable across a plurality of wireless cells, said terminal having display means for displaying data and a table for describing associations between base station-IDs and the nearest access points of a provider, and executing a wireless data exchange operation with a wireless base station serving one of said wireless cells where said terminal currently resides, said method comprising the steps of: receiving notification information from a wireless base station serving one of said wireless cells where said terminal currently resides; extracting a base station-ID from said received notification information; retrieving said table to acquire one of the access points associated with the base station-ID; attempting to establish a connection to the acquired access point; subsequent to establishment of the connection, downloading data through the connected access point; and causing said display means to display the downloaded data.

An eighth aspect of this invention resides in a method of controlling a wireless information processing terminal which is movable across a plurality of wireless cells, said terminal having input means for entering data and a table for describing associations between base station-IDs and the nearest access points of a provider, and executing a wireless data exchange operation with a wireless base station serving one of said wireless cells where said terminal currently resides, said method comprising the steps of: receiving notification information from a wireless base station serving one of said wireless cells where said terminal currently resides; extracting a base station-ID from said received notification information; retrieving from said table a record relating to the base station-ID; responding to successful finding of said record relating to the base station-ID in said table for attempting to establish a connection to the access point described in said record; responding to unsuccessful finding of said record relating to the base station-ID in said table by prompting a user to enter information about an access point; registering a record for associating the entered access point with the base station-ID into said table; and attempting to establish a connection to the entered access point.

A ninth aspect of this invention resides in a method of controlling a wireless information processing terminal which is movable across a plurality of wireless cells, said terminal having input means for entering data, display means for displaying data and a table for describing associations between base station-IDs and the nearest access points of a provider, and executing a wireless data exchange operation with a wireless base station serving one of said wireless cells where said terminal currently resides, said method comprising the steps of: receiving notification information from a wireless base station serving one of said wireless cells where said terminal currently resides; extracting a base station-ID from said received notification information; retrieving from said table a record relating to the base station-ID; responding to successful finding of said record relating to the base station-ID in said table for attempting to establish a connection to the access point described in said record; responding to unsuccessful finding of said record relating to the base station-ID in said table by prompting a user to enter information about an access point; registering a record for associating the entered access point with the base station-ID into said table; attempting to establish a connection to the entered access point; subsequent to establishment of the connection, downloading data through the connected access point; and causing said display means to display the downloaded data.

A tenth aspect of this invention resides in a method of controlling a wireless information processing terminal which is movable across a plurality of wireless cells, said terminal having display means for displaying data and a table for describing associations between base station-IDs and the nearest access points of an internet provider, and executing a wireless data exchange operation with a wireless base station serving one of said wireless cells where said terminal currently resides, said method comprising the steps of: receiving notification information from a wireless base station serving one of said wireless cells where said terminal currently resides; extracting a bare station-ID from said received notification information; retrieving said table to acquire a telephone number of an access point associated with the base station-ID; dialing to the acquired telephone number of said access point; subsequent to establishment of a connection, downloading Web data through the connected access point; and causing said display means to display the downloaded Web data.

An eleventh aspect of this invention resides in a computer readable storage medium for storing in a tangible form a computer program executable on a wireless information processing terminal which is movable across a plurality of wireless cells, said terminal having a table for describing associations between base station-IDs and the nearest access points of a provider, and executing a wireless data exchange operation with a wireless base station serving one of said wireless cells where said terminal currently resides, said computer program comprising: a routine for receiving notification information from a wireless base station serving one of said wireless cells where said terminal currently resides; a routine for extracting a base station-ID from said received notification information; a routine for retrieving said table to acquire one of the access points associated with the base station-ID; and a routine for attempting to establish a connection to the acquired access point.

A twelfth aspect of this invention resides in a computer readable storage medium for storing in a tangible form a computer program executable on a wireless information processing terminal which is movable across a plurality of wireless cells, said terminal having display means for displaying data and a table for describing associations between base station-IDs and the nearest access points of a provider, and executing a wireless data exchange operation with a wireless base station serving one of said wireless cells where said terminal currently resides, said computer program comprising: a routine for receiving notification information from a wireless base station serving one of said wireless cells where said terminal currently resides; a routine for extracting a base station-ID from said received notification information; a routine for retrieving said table to acquire one of the access points associated with the base station-ID; a routine for attempting to establish a connection to the acquired access point; a routine, being operative subsequent to establishment of the connection, for downloading data through the connected access point; and a routine for causing said display means to display the downloaded data.

A thirteenth aspect of this invention resides in a computer readable storage medium for storing in a tangible form a computer program executable on a wireless information processing terminal which is movable across a plurality of wireless cells, said terminal having input means for entering data and a table for describing associations between base station-IDs and the nearest access points of a provider, and executing a wireless data exchange operation with a wireless base station serving one of said wireless cells where said terminal currently resides, said computer program comprising: a routine for receiving notification information from a wireless base station serving one of said wireless cells where said terminal currently resides; a routine for extracting a base station-ID from said received notification information; a routine for retrieving from said table a record relating to the base station-ID; a routine, being responsive to successful finding of said record relating to the base station-ID in said table, for attempting to establish a connection to the access point described in said record; a routine, being responsive to unsuccessful finding of said record relating to the base station-ID in said table, for prompting a user to enter information about an access point; a routine for registering a record for associating the entered access point with the base station-ID into said table; and a routine for attempting to establish a connection to the entered access point.

A fourteenth aspect of this invention resides in a computer readable storage medium for storing in a tangible form a computer program executable on a wireless information processing terminal which is movable across a plurality of wireless cells, said terminal having input means for entering data and a table for describing associations between base station-IDs and the nearest access points of a provider, and executing a wireless data exchange operation with a wireless base station serving one of said wireless cells where said terminal currently resides, said computer program comprising: a routine for receiving notification information from a wireless base station serving one of said wireless cells where said terminal currently resides; a routine for extracting a base station-ID from said received notification information; a routine for retrieving from said table a record relating to the base station-ID; a routine, being responsive to successful finding of said record relating to the base station-ID in said table, for attempting to establish a connection to the access point described in said record; a routine, being responsive to unsuccessful finding of said record relating to the base station-ID in said table, for prompting a user to enter information about an access point; a routine for registering a record for associating the entered access point with the base station-ID into said table; and a routine for attempting to establish a connection to the entered access point.

A fifteenth aspect of this invention resides in a computer readable storage medium for storing in a tangible form a computer program executable on a wireless information processing terminal which is movable across a plurality of wireless cells, said terminal having display means for displaying data and a table for describing associations between base station-IDs and the nearest access points of an internet provider, and executing a wireless data exchange operation with a wireless base station serving one of said wireless cells where said terminal currently resides, said computer program comprising: a routine for receiving notification information from a wireless base station serving one of said wireless cells where said terminal currently resides; a routine for extracting a base station-ID from said received notification information; a routine for retrieving said table to acquire a telephone number of an access point associated with the base station-ID; a routine for dialing to the acquired telephone number of said access point; a routine, being operative subsequent to establishment of a connection, for downloading Web data through the connected access point; and a routine for causing said display means to display the downloaded Web data.

A wireless information processing terminal (alternatively called a "wireless mobile station" or a "mobile station"), which is represented by a PHS, establishes communication with another terminal (e.g., PHS or a conventional telephone connected by a wire) via at least one wireless base station (alternatively called "base station"). In general, two or more base stations are connected together by a communication network such as a PSTN or an ISDN (Integrated Services Digital Network). Accordingly, a mobile station dials-up to the nearest access point via a base station, thereby to establish a dial-up IP connection.

The mobile station may transmit/receive data to/from one base station within a certain range, which is limited to a given area centering around the base station due to attenuation of radiowaves or the like caused by environmental factors. In general, such an area is called the "wireless cell" (or simply "the cell"). When a mobile station enters a wireless cell that is served by one base station and this mobile station registers its current location at said one base station, this mobile station may establish a wireless communication with said one base station. Also, each base station may accommodate a plurality of mobile stations within its own wireless cell, thereby to control access to each of the mobile stations.

When using a PHS, which by definition outputs a weaker radiowave than a cellular telephone, a wireless cell has to have with a radius of hundreds of meters at most. Stated in another way, in such a case, it may frequently happen that a PHS moves across wireless cells. For this reason and to make preparations for repetitive location registration operations, a PHS base station periodically (at intervals of 1.2 seconds in accordance with the standards for the PHS public service) transmits a base station-ID (CS-ID) for indicating its existence, and a PHS mobile station responds to receipt of the base station-ID for registering its location at the base station. The invention has been made in consideration of the facts that a PHS base station transmits a base station-ID, and that a base station-ID contains base station location information.

A wireless information processing terminal (PHS) of this invention periodically receives notification information from a wireless base station, which serves a wireless cell covering the current location of this terminal. As is well known in the art, a predetermined field of the notification information is allocated to contain a base station-ID (CS-ID), whereas predetermined bit positions in the CS-ID are rendered to contain an NTT exchange identification number that is available as the location information (to be described below). Note here that "NTT" stands for Nippon Telegraph & Telephone Corp, though clearly the corresponding exchange information as supplied from any appropriate assigning entity is contemplated.

This terminal previously stores in its own memory an association table, which associates NTT exchanges' identification numbers with telephone numbers of the access points nearest to these exchanges. Since physical locations of the NTT exchanges are generally fixed, an association between each exchange and the access point nearest to each exchange may be uniquely determined in most cases. However, there may be an exceptional case where a plurality of exchanges are associated with an identical access point.

When a user of the inventive terminal requests connection to the Internet, the terminal extracts a CS-ID (more precisely, an NTT exchange identification number) from notification information transmitted from a current wireless base station and, then, retrieves the association table provided in its own memory, thereby to acquire the telephone number of the access point nearest to the current location.

Thus, the terminal dials-up to the acquired access point to establish an Internet connection. As a result, the terminal is allowed to download electronic mail destined therefor, a Web page (HTML file or the like) stored in a disk of a given Web server, and the like. Alternatively, the terminal is allowed to transmit data contained therein (or a file and/or electronic mail edited on this terminal) to another computer system connected to the Internet, or to upload such data to a disk of a given Web server.

To summarize, in the case of connecting an ever-moving wireless information processing terminal to the Internet, the nearest access point is automatically selected such that a dial-up IP connection is established. Thus, there is no need for a user to know the current location or the access point nearest to the current location.

Further, the computer readable storage medium relating to the eleventh through fifteenth aspects of this invention define a structural or functional collaborative relationship between a computer program and the storage medium for implementing functions of a wireless information processing terminal of this invention. In other words, by mounting the storage medium onto the terminal (or installing the computer program into the terminal), it becomes possible to demonstrate the collaborative functions on the terminal, thereby to obtain advantages similar to those of the first through fifth aspects of this invention.

Incidentally, while an association between a CS-ID (i.e., location information of each wireless base station) and an access point may be previously stored into the memory internal to the terminal, such an association may alternatively be learned one after another for storing therein. If a user's sphere of action is limited (this may be applied to a user who constantly commutes to and from his/her office without dropping in to another place), there will be no need to support information related to access points in broader areas. To support only a required number of access points in this way, it becomes possible to save memory capacity.

If a user of the wireless information processing terminal requests connection to the Internet, and if an access point associated with the current wireless base station is not yet registered at that time, the user may be prompted to enter a telephone number of a desired (in most cases, the nearest) access point. In response thereto, the terminal dials-up to the entered telephone number, and registers the entered telephone number in association with a CS-ID (more precisely, an NTT exchange identification number) of the current wireless base station. In so doing, when connection to the Internet is subsequently attempted from the cell served by the same wireless base station, the previously registered access point is automatically selected, thereby to automatically establish a dial-up IP connection.

BRIEF DESCRIPTION OF THE DRAWINGS

The foregoing and other objects, features and advantages of this invention will be apparent from the following detailed description of a preferred embodiment of this invention, as illustrated in the accompanying drawings wherein.

DETAILED DESCRIPTION OF THE PREFERRED EMBODIMENT

Figure 1:
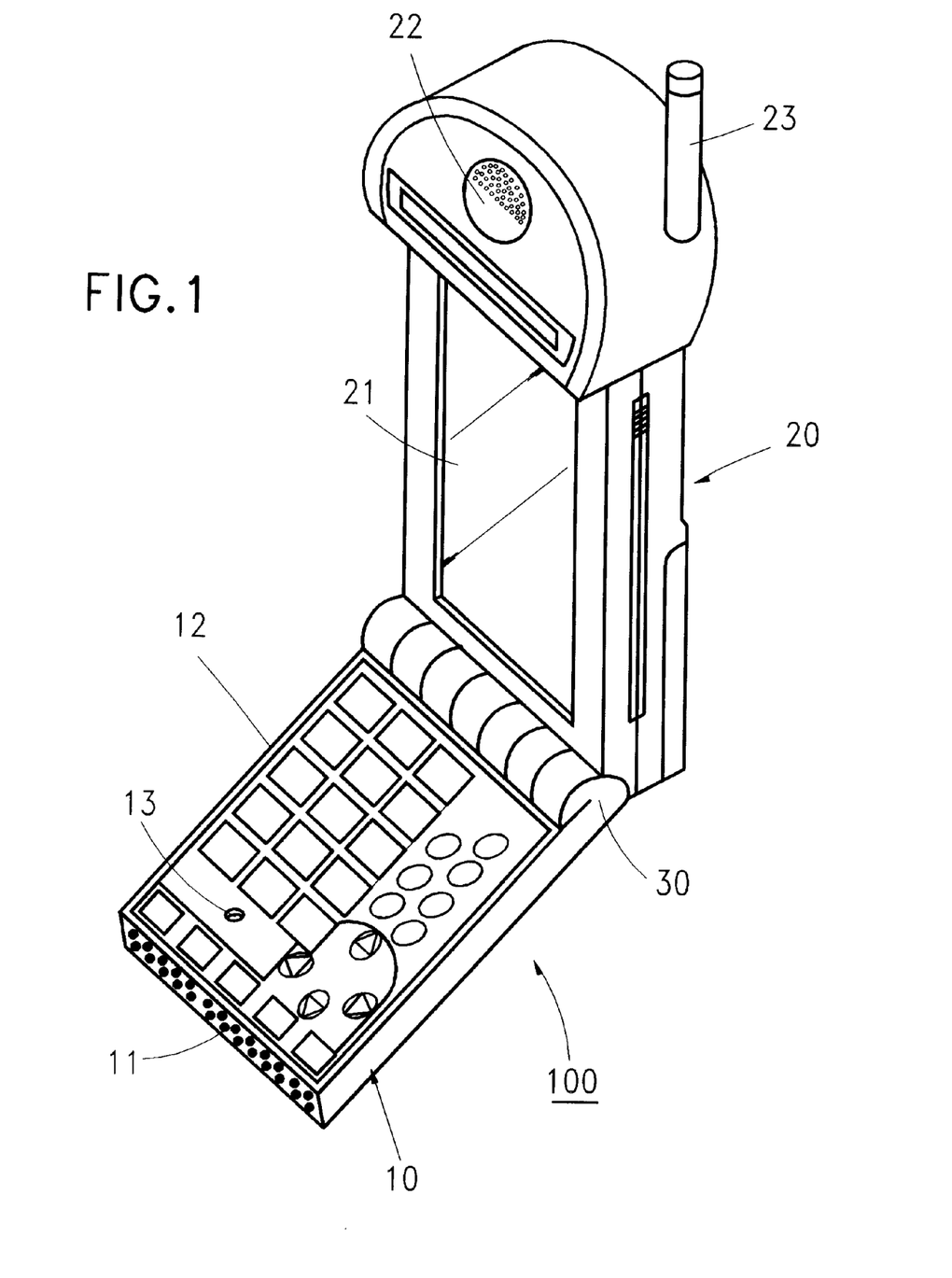
FIG. 1 shows an external view of an information processing terminal 100 adapted for implementing this invention.

FIG. 1 shows an external view of a representative information processing terminal 100 adapted for implementing this invention. It should be understood that the terminal 100 is provided with both functions of the so-called PDA (Personal Digital Assistant) and PHS (Personal Handyphone System) for a wireless communication.

As shown in FIG. 1, the information processing terminal 100 comprises a relatively thin first housing 10 and a relatively thick second housing 20. The second housing 20 is pivotably supported by a hinge 30 at one end of the first housing 10. The first housing 10 has an interface defined by PCMCIA (Personal Computer Memory Card International Association) and JEIDA (Japan Electronic Industry Development Association). An exemplary external computer system connectable to the information processing terminal 100 of the present embodiment is a personal computer with a PC card slot, which conforms to the specification of OADG (PC Open Architecture Developer's Group), such as a notebook PC called "IBM ThinkPad 765" ("ThinkPad" is a trademark of IBM Corp.), commercially available from IBM Japan, Ltd.

On the top surface of the first housing 10, a keyboard 12 including a plurality of keypads is provided. The keyboard 12 comprises ten number keys, function keys, cursor keys, a power switch, as well as a key input control circuit embedded in the housing for generating a scan code in response to a key input. The keyboard 12 is used as the input means for the PDA functions, and when the terminal 100 is used as a PHS, the keyboard is used for entering a telephone number or for switching operation modes. Further, on the top surface, an upper portion of a microphone 13 for inputting audio signals is exposed. The microphone 13 is used for a speech conversation when the terminal 100 is used as a PHS.

On the surface of the second housing 20, a liquid crystal display 21 is provided as the output means for PDA functions. In the one representative embodiment, the display 21 has a relatively large screen of 200×320 dot resolution. On the display 21, processed data (e.g., PIM (Personal Information Manager) data downloaded from a PC, contents of a Web page, and/or electronic mail received at the PHS section, or the like) is displayed.

A top edge portion of the second housing 20 is formed in a semicylindrical shape. On the surface of this semicylindrical shape, a speaker 22 for outputting a voice signal is provided. Further, at the left side edge of the second housing 20, an antenna 23 for wireless transmission/reception is mounted along a longitudinal axis of the second housing 20.

Figure 2:
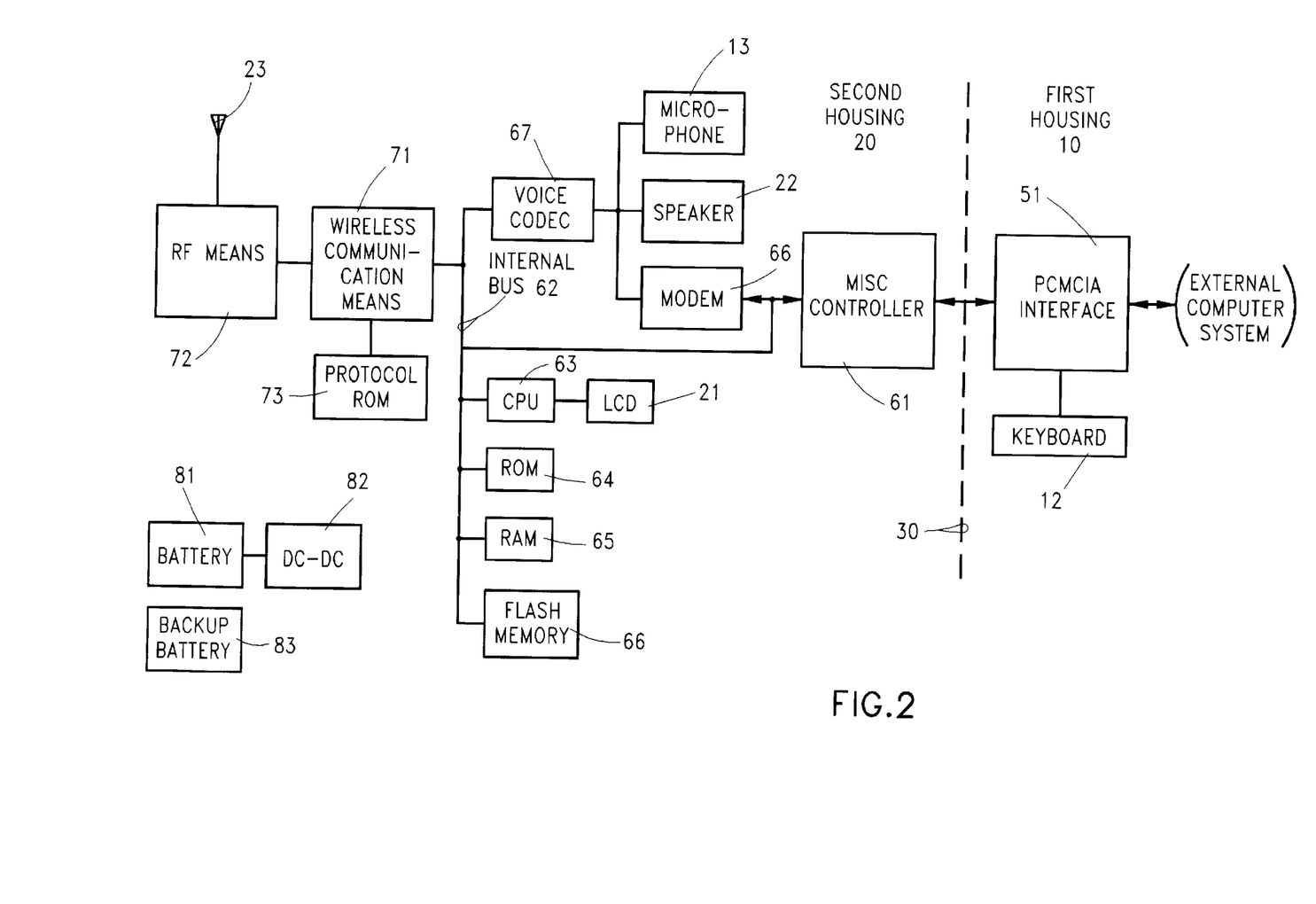
FIG. 2 schematically shows an internal hardware configuration of the information processing terminal 100.

FIG. 2 schematically shows an internal hardware configuration of the information processing terminal 100. In the first housing 10, there is mounted a PCMCIA interface 51. In the present embodiment, the PCMCIA interface 51 is a circuit that includes functions for implementing an interface protocol with a connected external computer system, as well as other functions for generating a scan code in response to a key input on the keyboard 12. Such a circuit may be made by using the ASIC (Application Specific Integrated Circuit) technology. Data downloaded from an external computer system (not shown) is captured into the terminal 100 via this PCMCIA interface 51.

In the second housing 20, there are mounted almost all components for the PDA functions to process computer data, together with major components for the PHS functions to implement wireless communication. It should be understood in this respect that the hatched hardware blocks shown in FIG. 2 are those components dedicated to the wireless communication functions.

An MISC controller 61 is provided with functions for feeding signals from the PCMCIA interface 51 to an internal bus 62. On the internal bus 62, each component is interconnected. Of these components, a CPU 63 is a main controller for controlling the PDA functions of the information processing terminal 100. CPU 63 is also arranged to control the display 21. ROM 55 is a read-only memory, which permanently stores code groups for controlling hardware operations in the terminal 100. RAM 65 is a writable volatile memory, which is primarily used as a working area of CPU 63. Flash memory 66 is an erasable non-volatile memory, which is used for retaining, for example, confidential data of the terminal 100.

In the case of using the terminal 100 as a PDA, its operating system (OS) and applications (e.g., "Dialer" for calling a called party's telephone, "Browser" for browsing a Web page on the Internet, "Mail" for exchanging electronic mail via the Internet, and the like) may be saved in the flash memory 66.

A voice CODEC 67 is a dedicated circuit for expanding/compressing voice data. For example, voice data inputted via the microphone 13 is compressed by the voice CODEC 67 and is subsequently captured into the terminal 100. Conversely, voice data expanded by the voice CODEC 67 is outputted by the speaker 22 as a voice. A modem 66 is a dedicated circuit for modulating computer data as an analog signal available on a telephone line, or conversely, for demodulating a received analog signal as computer data. For example, computer data received from an external computer system via the PCMCIA interface 51 and the MISC controller 61 is modulated by the modem 66, compressed by the voice CODEC 67, and then converted into a wireless code for transmission from the antenna 23. Conversely, a received wireless code is demodulated by the modem 66 and, then, processed by the internal CPU 63 or a connected external computer system (not shown).

A wireless communication means 71 is a main controller for administering the PHS functions of the terminal 100. Also, this wireless communication means 71 supports a variety of functions as a PHS telephone, including but not limited to calling on a telephone directory, redial, history of call incoming, dial lock, calling party number identification, automatic answering telephone service, and the like. A protocol ROM 73 permanently stores control codes for performing operations in accordance with predetermined communication schemes. In general, communication schemes are different for each of the carriers (e.g., Astel, DDI Pocket and the like).

RF means 72 is a dedicated circuit for implementing input/output of wireless data via the antenna 23. The RF means 72 outputs transmission data passed from the wireless communication means 71 as wireless data, or conversely, it captures wireless data received via the antenna 23 into the terminal 100.

The terminal 100 is provided with a battery 81 as a primary power source. For the battery 81, a secondary battery such as a lithium-ion battery may be adopted. Output terminal voltage of the battery 81 is level-converted by a DC-DC converter 82 and then fed to each component. Also, there is provided a backup battery 83.

Note that additional electronic circuits or the like other than those shown in FIG. 2 are required to construct the information processing terminal 100 for implementing both of the PDA functions and the PHS functions. However, these components are not described in the present specification, since they are well known in the art and do not pertain to the gist of this invention. Also, it should be understood that for brevity of the drawings, only a portion of the connections among the illustrated hardware blocks is shown.

Figure 3:
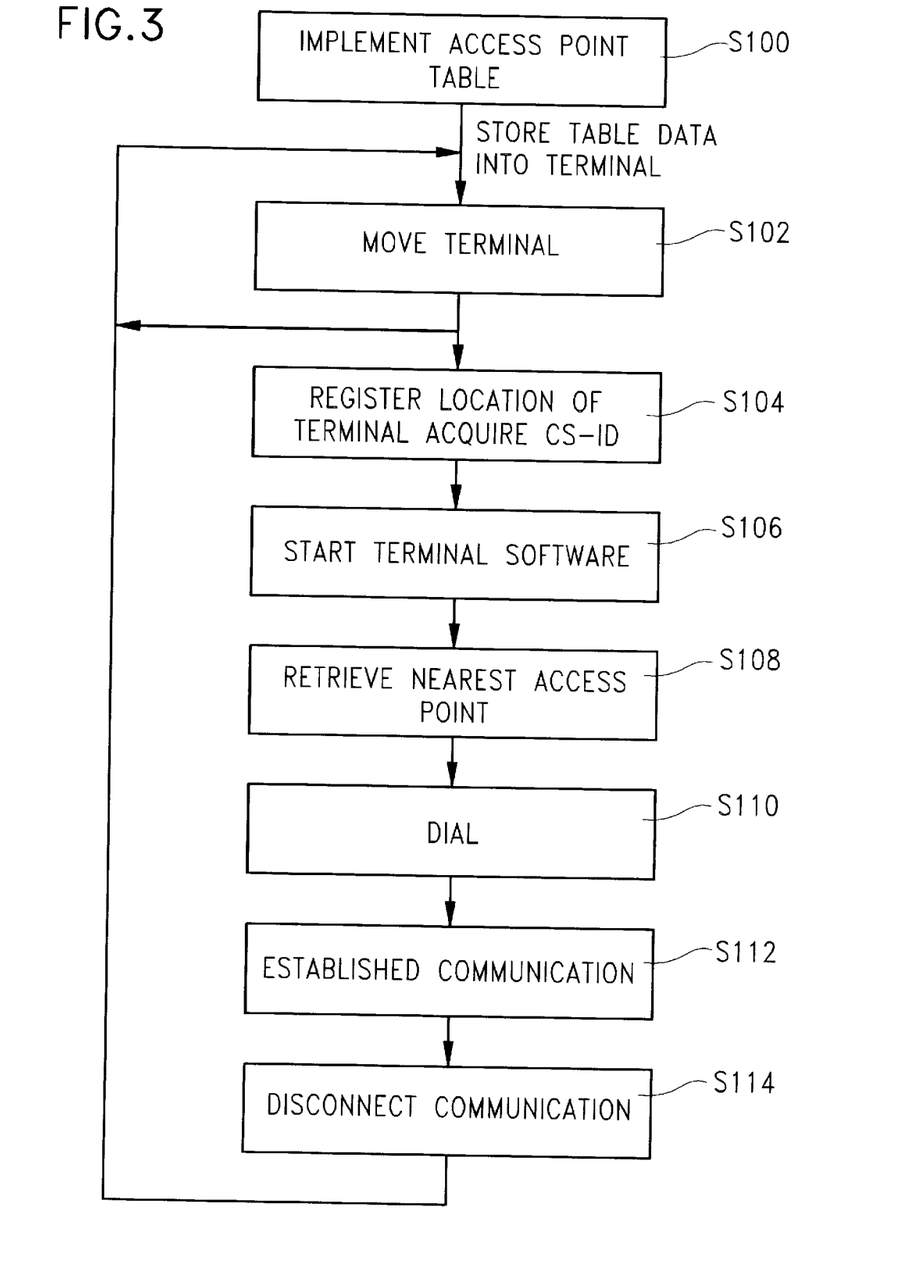
FIG. 3 shows a flow chart of a first operational example of the information processing terminal 100.

FIG. 3 shows a flow chart of a first operational example of the information processing terminal 100. In this example, it is assumed that the terminal 100 is previously rendered to implement therein (e.g., in a memory such as ROM 64, flash memory 66 or the like) an association table for associating each PHS support area (i.e., each base station) with the nearest access point of a destined Internet (or BBS) provider (step S100).

Table 1, as set forth below, schematically illustrates the association table. In this table, one record is prepared for each of the NTT exchanges respectively, and the record includes fields for containing an NTT exchange identification number and a telephone number of its associated access point. Since locations of the NTT exchanges are physically fixed, and they imply locations of calling parties (callers), it is possible to determine the nearest access point by using an NTT exchange identification number. Incidentally, in regard to such an area with an NTT toll number where no access point of the Internet/BBS provider exists, data of the nearest access point may be conveniently retained, or an NTT toll number may be simply calculated to select an access point.

TABLE 1

| NTT Exchanges' IDs (Callers' Locations) | Access Points' Telephone Nos. (BBS or the like) |
|---|---|
| AAA | aaaa –aa –aaaa |
| BBB | bbbb –bb –bbbb |
| CCC | bbbb –bb –bbbb |
| DDD | dddd –dd –dddd |
| . | . . . |
| . | . . . |

The association table may be permanently stored into ROM 64 of the information processing terminal 100 by its manufacturer before its shipment, or the table may be alternatively written into the flash memory 66 such that the content thereof is appropriately updated. In consideration of a trend that new access points are further constructed in the near future, the latter approach will be more useful (e.g., an update method of the table may rely on downloading from an external computer system via the PCMCIA interface 51, or a wireless transmission from the contracted internet/BBS provider).

Next, a user carrying the information processing terminal 100 moves in another cell (step S102). In response to movement across cells, the information processing terminal 100 performs location registration at the base station of the newly entered cell, as is well known in the art (step S104). In accordance with the well known standards for the PHS public service, each base station is defined to periodically (e.g., 1 slot per 1.2 second interval) transmit notification information for location registration of a PHS mobile station.

Figure 4:
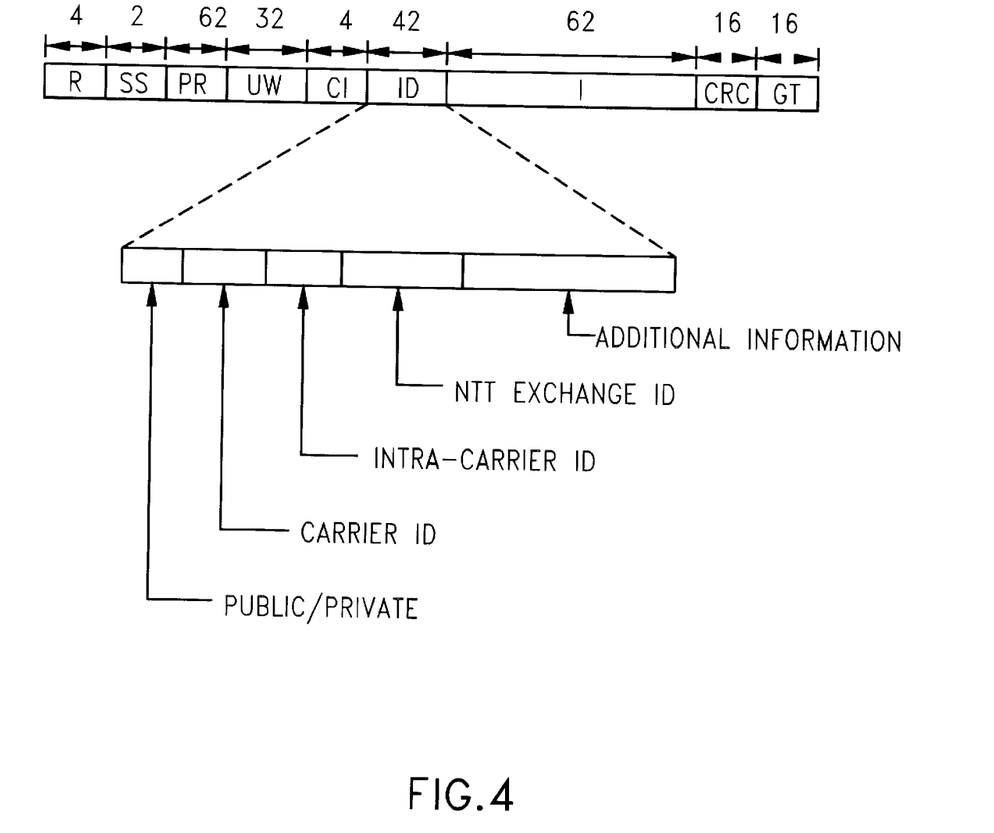
FIG. 4 schematically shows a format of notification information in accordance with one aspect of the present invention.

FIG. 4 schematically shows a format of this notification information. The R and GT fields contain ramp bits and guard bits respectively, each providing a sufficient margin for transient response. The SS and PR field, contain a start symbol and preamble, respectively, each forming continuous signals of 2T used for bit synchronization. The UW field contains a unique word used for frame synchronization. The CI field contains a channel identifier, which is equal to 4 (hex) for the notification information. The I field contains 62 bits allocated to an information message, and describes a configuration of a super-frame or the like in a predetermined format. The CRC field contains a CRC (cyclic redundancy check) code. The ID field contains a base station-ID (CS-ID), which normally comprises 42 bits. The CS-ID field is further divided into subfields, including "public/private", "carrier identification number", "intra-carrier identification number", "NTT exchange identification number" and "additional information". It is to be noted that the structure of the CS-ID may be slightly changed for each of the carriers. In the "NTT exchange identification number" subfield, there is described an identification number of an NTT exchange that covers the current base station. Note that such an identification number has a one-to-one correspondence with an NTT toll number (e.g., "03" for Tokyo, "045" for Yokohama).

Referring to FIG. 3 again, if the terminal 100 acquires a CS-ID, the process returns to step S102 again, where it waits for either entrance of the terminal 103 into the next cell or starting of given terminal software. Incidentally, the acquired CS-ID of the current base station has been saved in a given address of the flash memory 66, for example.

It is assumed here that a user of the information processing terminal 100 starts terminal software such as "Browser" for browsing a Web page, "Mail" for exchanging electronic mail or the like (step S106). Since starting of "Browser" or "Mail" is subject to connection to the Internet, another terminal software, "Dialer", is invoked to connect to the Internet.

First, "Dialer" extracts an NTT exchange identification number from the current CS-ID previously acquired and, then, retrieves a record for this identification number from the association table as set forth in [TABLE 1], thereby to acquire a telephone number of an access point that is nearest to the current location (step S108). Next, "Dialer" dials the acquired telephone number of this access point (step S110).

When the terminal 100 is authenticated by the selected access point and a communication therewith is established, a dial-up connection to the contracted provider is accomplished. As a result, the terminal 100 is allowed to access a desired Web server for acquiring a Web page, or to exchange electronic mail (step S112).

When a user closes the active terminal software (e.g., "Browser" or "Mail") after having done an intended work such as browsing of a Web page or exchanging electronic mail, the currently established communication with the access point is disconnected (step S114). Thereafter, the process returns to step S102, where it waits for either entrance of the terminal 100 into the next cell or starting of given terminal software.

Figure 5:
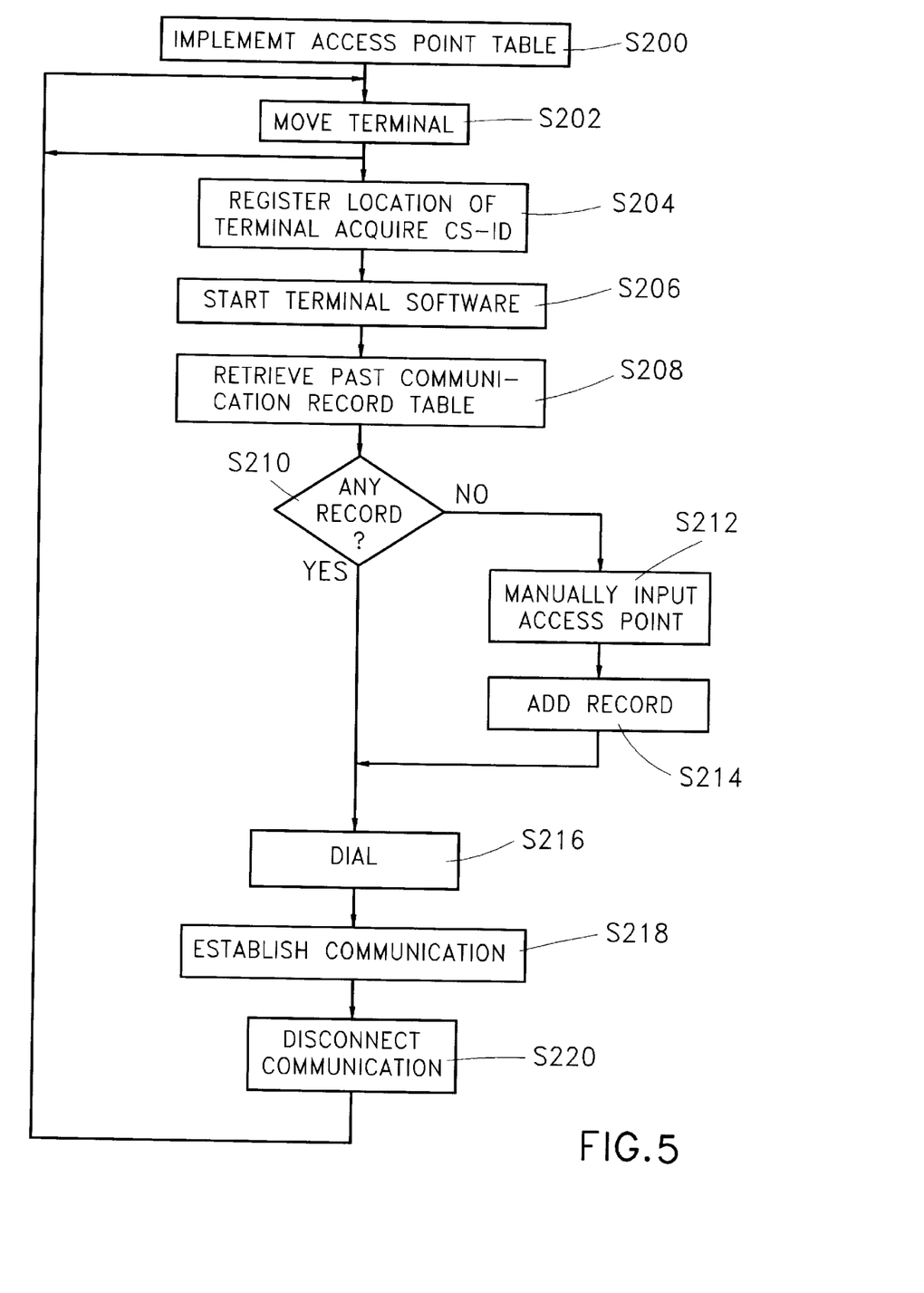
FIG. 5 shows a flow chart of a second operational example of the wireless information processing terminal 100.

In FIG. 5, there is shown a flow chart of a second operational example of the wireless information processing terminal 100. In the flash memory 66, there is provided an association table for associating each PHS support area with its nearest access point of a destined Internet (or BBS) provider. While the format of this association table is substantially the same as that of TABLE 1, it is assumed here that at the time of shipping the terminal 100, this table is initially in a blank condition, and whenever the terminal 100 is subsequently connected to the Internet or BBS under a mobile environment, one or more records are added or updated (i.e., learned) respectively (step S200). In this sense, the association table in the present example has a role of a "communication record table" of the terminal 100.

Next, it is assumed at this stage that a user carrying the information processing terminal 100 moves into another cell (step S202). In response to movement across cells, the information processing terminal 100 performs location registration at the base station of the newly entered cell, as is well known in the art (step S204). In accordance with the well known standards for the PHS public service, each base station is defined to periodically (1 slot per 1.2 second interval) transmit notification information for location registration of a PHS mobile station. Such notification information (e.g., the format of the CS-ID or the like) was already described above, with reference to FIG. 4.

If the terminal 100 acquires a CS-ID along with location registration, the process returns to step S202, where it waits for either entrance of the terminal loo into the next cell or starting of given terminal software. Incidentally, the acquired CS-ID of the current base station has been saved in a given address of the flash memory 66, for example.

It is assumed here that a user of the information processing terminal 100 starts terminal software such as "Browser" for browsing a Web page, "Mail" for exchanging electronic mail or the like (step S206). Since starting of "Browser" or "Mail" is subject to connection to the Internet, it requests another terminal software, "Dialer", to connect to the Internet. First, "Dialer" extracts an NTT exchange identification number from the current CS-ID previously acquired and, then, retrieves a record for this identification number from the past "communication record table" (step S208). If there is any communication record for the current NTT exchange identification number, this record is referenced to acquire a telephone number of the nearest access table. Then, "Dialer" dials the acquired telephone number of this access point (step S216).

On the other hand, if there is no communication record for the current NTT exchange identification number for any reason (e.g., this is the first occasion to access the Internet from the current cell), a user is prompted on the display 21, for example, to manually input a telephone number of a desired access point (step S212). Thereafter, a record that describes an association between the inputted telephone number of this access point and the current NTT exchange identification number is written into the "communication record table" (step S214). Then, the telephone number of this access point is dialed accordingly.

When the terminal 100 is authenticated by the selected access point and a communication therewith is established, a dial-up connection to the contracted provider is accomplished. As a result, the terminal 100 is allowed to access a desired Web server for acquiring a Web page, or to exchange electronic mail (step S218).

When a user closes the active terminal software (e.g., "Browser" or "Mail") after having done the intended work, such as browsing of a Web page or exchanging electronic mail, the currently-established communication with the access point is disconnected (step S220). Thereafter, the process returns to step S202, where it waits for either entrance of the terminal 100 into the next cell or starting of given terminal software.

Because of constraints such as manufacturing costs, packaging spaces and the like, it would be difficult for certain types of information processing terminals 100 to have association tables large enough to include a sufficient number of access points that are scattered around the whole PHS support areas (e.g., all parts of Japan). In such a case, the aforesaid second operational example will be advantageously applied. Further, in another case where a user's sphere of action is limited to commuting areas and/or specific business-trip cities, which leads to a relatively small number of records to be contained in the association table, the aforesaid second operational example will be advantageously applied to save the required memory capacity.

In the above, this invention has been described in detail with reference to a specific embodiment. However, it should be understood that various changes or substitutions in the embodiment may be made by those skilled in the art without departing from the gist of this invention. In other words, since this invention has been disclosed by way of illustration and not limitation, reference should be made to the aforesaid claims to determine the scope of this invention.

What is claimed is:

1. A wireless information processing terminal which is movable across a plurality of wireless cells, and executes a wireless data exchange operation with a wireless base station serving one of said wireless cells where said terminal currently resides, comprising:

communication means for executing a communication with a wireless base station;

means for extracting a base station-ID from data received from a wireless base station;

memory means for storing records representing associations between the base station-IDs and the nearest access points of a provider;

access point retrieving means for accessing said memory means and attempting to retrieve the record of one of the access points associated with a current wireless base station;

means, responsive to successful finding of said record for attempting to establish a connection to the retrieved access point;

user input means for receiving user input;

prompt means, responsive to unsuccessful finding of said record in said table, for prompting a user to enter information about an access point; and registration means for registering a record for associating the entered access point with its base station-ID into said memory means.

2. A wireless information processing terminal which is movable across a plurality of wireless cells, and executes a wireless data exchange operation with a wireless base station serving one of said wireless cells where said terminal currently resides, comprising:

communication means for executing a communication with a wireless base station;

display means for displaying processed data;

means for extracting a base station-ID from data received from a wireless base station;

memory means for storing records comprising associations between the base station-IDs and the nearest access points of a provider;

access point retrieving means for accessing said memory means and for attempting to retrieve the record of one of the access points associated with a current wireless base station;

means, responsive to successful finding of said record for attempting to establish a connection to the retrieved access point;

means, responsive to successful finding of said record for attempting to establish a connection to the retrieved access point;

user input means for receiving user input;

prompt means, responsive to unsuccessful finding of said record in said table, for prompting a user to enter information about an access point;

registration means for registering a record for associating the entered access point with its base station-ID into said memory means;

data download means for downloading data through the connected access point; and display control means for causing said display means to display the downloaded data.

3. A wireless information processing terminal which is movable across a plurality of wireless cells, and executes a wireless data exchange operation with a wireless base station serving one of said wireless cells where said terminal currently resides, comprising:

communication means for executing a communication with a wireless base station;

display means for displaying processed data;

means for extracting a base station-ID from data received from a wireless base station;

memory means for storing associations between the base station-IDs and telephone numbers of the nearest access points of an internet provider;

access point retrieving means for accessing said memory means and for attempting to retrieve the telephone number of an access point associated with the current wireless base station;

means, responsive to successful finding of said telephone number for attempting to establish a connection to the retrieved access point;

user input means for receiving user input;

prompt means, responsive to unsuccessful finding of said telephone number in said table, for prompting a user to enter information about an access point;

registration means for registering a record for associating the entered access point with its base station-ID into said memory means;

data download means for downloading Web data through the dialed access point; and display control means for causing said display means to display the downloaded Web data.

4. A method of controlling a wireless information processing terminal which is movable across a plurality of wireless cells, said terminal having a table for describing associations between base station-IDs and the nearest access points of a provider, and input means for entering data and of executing a wireless data exchange operation with a wireless base station serving one of said wireless cells where said terminal currently resides, said method comprising the steps of:

receiving notification information from a wireless base station serving one of said wireless cells where said terminal currently resides;

extracting a base station-ID from said received notification information;

retrieving said table to acquire one of the access points associated with the base station-ID;

responding to successful finding of said record relating to the base station-ID in said table for attempting to establish a connection to the access point described in said record;

responding to unsuccessful finding of said record relating to the base station-ID in said table for prompting a user to enter information about an access point;

registering a record for associating the entered access point with the base station-I-D into said table; and attempting to establish a connection to the acquired access point.

5. The method of claim 4 wherein said terminal further comprises display means for displaying data and wherein said method further comprises the steps of:

subsequent to establishment of the connection, downloading data through the connected access point; and causing said display means to display the downloaded data.

6. The method of claim 5 wherein said retrieving comprises retrieving said table to acquire a telephone number of an access point associated with the base station-ID; and further comprising the steps of:

dialing to the acquired telephone number of said access point;

subsequent to establishment of a connection, downloading Web data through the connected access point; and causing said display means to display the downloaded Web data.

7. The method of claim 4 wherein said terminal further comprises display means for displaying data, further comprising the steps of:

subsequent to establishment of the connection, downloading data through the connected access point; and causing said display means to display the downloaded data.

8. A computer readable storage medium for storing in a tangible form a computer program executable on a wireless information processing terminal which is movable across a plurality of wireless cells, said terminal having a table for describing associations between base station-IDs and the nearest access points of a provider and input means for entering data, and for executing a wireless data exchange operation with a wireless base station serving one of said wireless cells where said terminal currently resides, said computer program comprising:

a routine for receiving notification information from a wireless base station serving one of said wireless cells where said terminal currently resides;

a routine for extracting a base station-ID from said received notification information;

a routine for retrieving said table to acquire one of the access points associated with the base station-ID;

a routine, being responsive to successful finding of said record relating to the base station-ID in said table, for attempting to establish a connection to the access point described in said record;

a routine, being responsive to unsuccessful finding of said record relating to the base station-ID in said table, for prompting a user to enter information about an access point; and a routine for registering a record for associating the entered access point with the base station-ID into said table.

9. The computer readable storage medium of claim 8, wherein said terminal additionally comprises at least one display means, said method further comprising:

a routine, being operative subsequent to establishment of the connection, for downloading data through the connected access point; and a routine for causing said display means to display the downloaded data.

10. The computer readable storage medium of claim 8 wherein said terminal further comprises display means for displaying data wherein said routine for retrieving comprises a routine for retrieving said table to acquire a telephone number of an access point associated with the base station-ID; and wherein said routine for attempting comprises a routine for dialing to the acquired telephone number of said access point; further comprising:

a routine, being operative subsequent to establishment of a connection, for downloading Web data through the connected access point; and a routine for causing said display means to display the downloaded Web data.

* * * * *